United States Patent

[11] 3,568,171

[72] Inventor Tommy G. Lesher
Fullerton, Calif.
[21] Appl. No. 786,123
[22] Filed Dec. 23, 1968
[45] Patented Mar. 2, 1971
[73] Assignee Hughes Aircraft Company
Culver City, Calif.

[54] HIGH DENSITY SHIFT REGISTER STORAGE MEDIUM
9 Claims, 10 Drawing Figs.

[52] U.S. Cl. .......... 340/174, 252/62.51, 75/170, 29/198
[51] Int. Cl. .......... G11c 19/00, G11c 11/12
[50] Field of Search .......... 340/174; 75/170; 252/62.51; 29/198

[56] References Cited
UNITED STATES PATENTS
3,422,407 1/1969 Gould et al. .......... 340/174

*Primary Examiner*—Stanley M. Urynowicz, Jr.
*Attorneys*—James K. Haskell and Robert Thompson

ABSTRACT: A magnetic shift register including a fine drawn wire magnetic recording medium of cobalt, iron and vanadium which is annealed, the wire being wound under tension in a helix around a cylindrically disposed polyphase advancing array which includes a plurality of advancing windings oriented transverse to the wire so that a magnetic domain recorded on a segment of the wire can be propagated through the length of the wire by the polyphase advancing array when current pulses are applied to the windings. A read winding is disposed around the wire toward one end thereof so that the propagated magnetic domain induces an output signal in it as it is propagated therethrough.

INVENTOR.
TOMMY G. LESHER,
BY
Robert Thompson
ATTORNEY.

INVENTOR.
TOMMY G. LESHER,
BY
Robert Thompson
ATTORNEY.

HIGH DENSITY SHIFT REGISTER STORAGE MEDIUM

BACKGROUND OF THE INVENTION

This invention relates generally to an improved magnetic shift register and storage device, and more particularly to improvements in a magnetic storage medium.

Heretofore, magnetic memory systems and shift registers have been constructed using magnetic wire wound in a helical manner around a cylindrical polyphase driving arrangement. In operation, a magnetic domain recorded on a segment of the wire has been advanced or selectively propagated by the polyphase driving arrangement during a four-phase timing cycle by selectively applying current pulses to the polyphase driving arrangement. More specifically, the polyphase driving arrangement included a plurality of drive windings, each disposed parallel to one another about the cylindrical surface and interconnected to produce a magnetic field which is generally parallel to the axis of the wire. The wire is subjected to tensile stress and a magnetic domain is recorded on a segment thereof, preferably near one end. This domain is then propagated along the wire by the polyphase driving arrangement. A read winding, located preferably at the other end of the wire, produces an output signal when the magnetic domain is propagated through it along the wire.

If the drive field H produced by the polyphase advancing array is greater than the domain wall motion threshold $H_o$ (the field below which no domain wall motion can occur), the longitudinal velocity of the propagated wall will be proportional to $(H-H_o)$. The maximum drive field H that can be applied to the magnetic medium is, however, limited by the nucleating threshold field $H_s$ for the driven segment of the magnetic medium. Thus, it is necessary for the magnetic medium to exhibit a differential between the domain wall motion threshold field $H_o$ and the nucleating threshold field $H_s$ where the drive field H is greater than $H_o$ and less than $H_s$. However, practical high volumetric storage density information retaining devices can only be readily obtained from a storage medium having a substantial differential between these two threshold field parameters. In addition, the magnitude of the domain wall motion threshold field $H_o$ must be properly matched to the total amount of demagnetizing field $H_d$ supported by the magnetic medium if a large number of informational magnetic domains are to be stored in a small space.

SUMMARY OF THE INVENTION

An object of this invention is to provide an improved storage medium and storage means which operates on the above described principle.

Another object is to provide improvements in the volumetric storage density of a magnetic storage device or shift register of the above described type.

The above and other objectives of this invention can be attained by providing a drawn fine wire of 2 percent —5 percent by weight vanadium, 38 percent —39 percent by weight cobalt, and the remainder iron, wherein the ratio of cobalt to iron is kept to 2:3. This drawn wire is then annealed by heating it to a temperature level for a sufficient length of time to significantly destroy or break up the slip induced atomic order present within the wire as a result of drawing, and then quickly quenching it in a hydrogen atmosphere. Alloy wire, heat treated in the described manner, has the advantage that it can be used to form a cylindrically disposed shift register that will support higher volumetric storage densities than were previously available from straightforward shift register structures, since the magnitude of the domain wall motion threshold field $H_o$ is matched to the total demagnetizing field $H_d$ resulting from the magnetic flux supported by the wire.

Other objects, features and advantages of this invention will become apparent upon reading the following detailed description and referring to the accompanying drawings, in which:

Figures 1A, 1B, 1C, 1D:
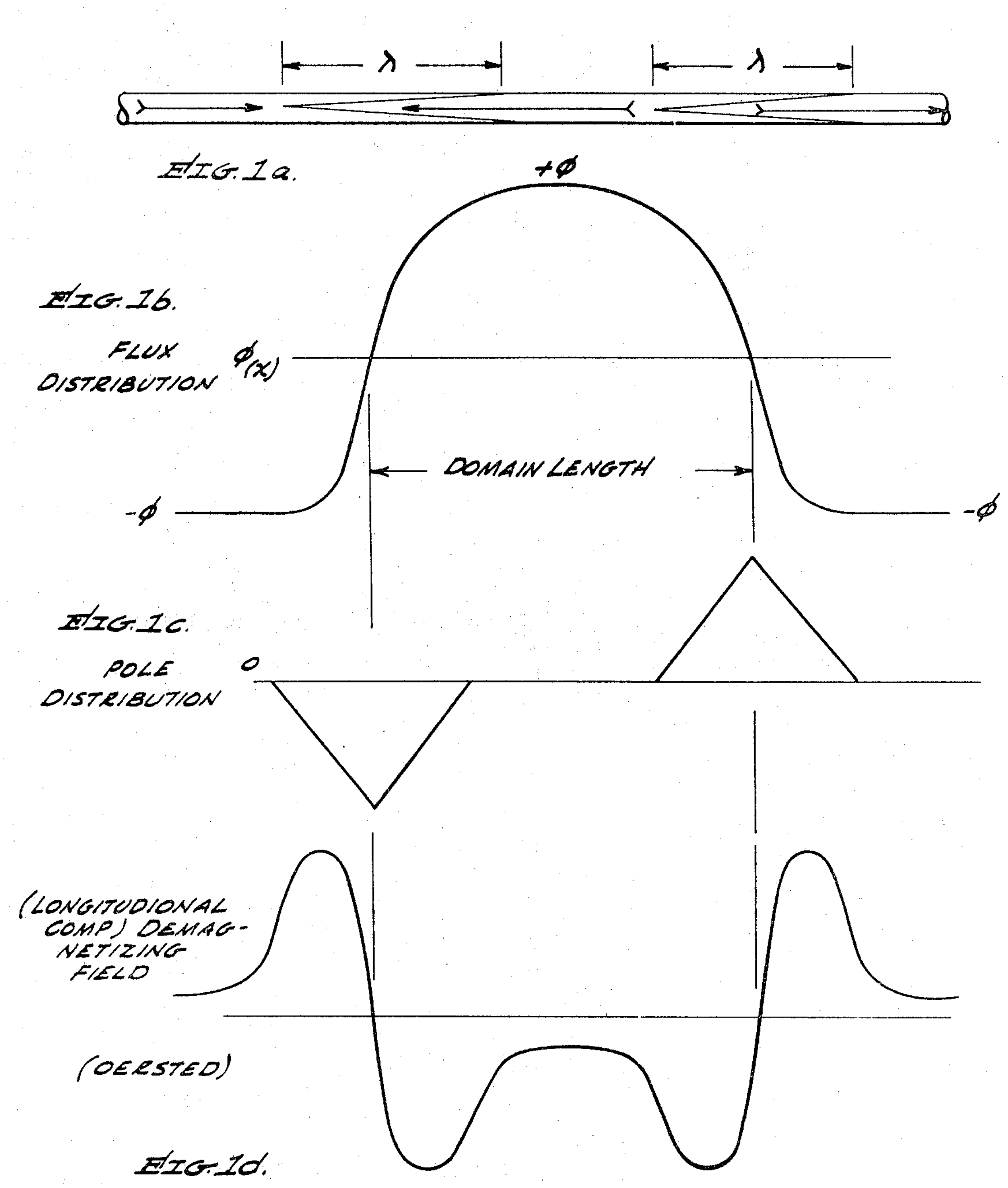
FIGS. 1*a* through 1*d* are diagrams which respectively schematically illustrate a magnetic domain recorded on a magnetic wire, the associated level of the flux distribution, the pole distribution, and the longitudinal component of the demagnetizing field supported by the wire.

Generally, a magnetic storage medium which is in the form of an elongate wire under tensile stress can have magnetic domains stored in segments therealong. In order to operate in a shift register, the magnetic medium must: be highly magnetically oriented; by first magnetized in a reference polarity; and exhibit a difference between the nucleating threshold field $H_s$ (the magnetic field energy required to create a reversed polarity magnetic domain) and the domain wall motion threshold field $H_o$ (the field energy required to make the reversed magnetic domain expand and/or contract one it has been formed). A bulk ferromagnetic media will display a differential between the domain wall motion threshold field $H_o$ and the nucleating threshold field $H_s$ when the degree of magnetic orientation is brought above a critical level. When such a magnetic medium exhibits a differential in its threshold field characteristics and an external field which is greater than the nucleating threshold field $H_s$ is applied, it tends to switch from a reference magnetic polarity to an opposite polarity through the formation of a small reversed nucleus at some point within the medium, whereupon the nucleus grows by propagational switching to the extremities of the magnetic field which initiated the switching action. This creates a reversed magnetic domain relative to the reference polarity, along a segment of the storage medium located between portions of the magnetic medium, magnetized to the reference magnetic polarity.

When tensile stress is applied to the magnetic medium, the high degree of longitudinal magnetic orientation is induced and/or enhanced in the magnetic material. Consequently, the domain wall or transition region existing between two adjacent segments of an oppositely magnetized magnetic medium can be made to shift in one direction or the other by applying a controlled magnetic drive field H parallel to the axis of the magnetic medium over the magnetic domain and of a polarity which favors the magnetic domain region that is desired to be shifted and then shifting the magnetic drive field. More specifically, this drive field H can be generated by applying current pulses to a suitable field generating winding which traverses the magnetic medium. If the magnetic drive field H is greater than the domain wall motion threshold field $H_o$ (the field below which no domain wall motion can occur), the longitudinal velocity of the propagated wall will be proportional to $(H-H_o)$. The maximum drive field H that can be applied to the magnetic medium is limited by the nucleating threshold field $H_s$ for the driven segment of the magnetic medium. Thus, it is necessary for the magnetic medium to exhibit a differential between the domain wall motion threshold field $H_o$ and the nucleating threshold field $H_s$ where H is greater than $H_o$ and less than $H_s$. However, practical high volumetric storage density information devices can best be obtained from a storage medium having a substantial differential (greater than 7 oersteds) between these two threshold field parameters. In addition, the magnitude of the domain wall motion threshold field $H_o$ must be properly matched to the total amount of demagnetizing field $H_d$ generated by the magnetic flux supported within by the magnetic medium if a large number of informational magnetic domains are to be stored in a small space. For example, it is estimated that as many as 10,000 information magnetic domains can be stored per cubic inch of magnetic storage wire medium which possesses a domain wall motion threshold field $H_o$ greater than b 15 oersteds, if the total demagnetizing field $H_d$ supported by the magnetic medium is kept below 9.0 milli-maxwells.

Of the various ferromagnetic media which display the propagational characteristics, fine wire appears to be most attractive for magnetic shift register applications, since it can be fabricated in extremely long lengths and evaluated magnetically prior to fabrication of a device.

As illustrated in FIG. 1*a*, a magnetic domain of a reversed magnetic polarity recorded on a length of the magnetic recording medium in the form of a wire has a transition region or domain wall, of length λ at each end. The transition regions define the interface between the portions of magnetic medium which have been magnetized to a reference polarity and the magnetic domain portion of the magnetic medium that has been magnetized to the reversed polarity. The magnetic flux $\Phi_{(x)}$ supported by the magnetic medium will have a distribution along the wire similar to the waveform illustrated in FIG. 1*b*. The magnetic pole distribution $m_{(x)}$ that normally occurs in the transition region will be distributed per unit length of wire, similar to the waveforms of FIG. 1*c*. The longitude component of the demagnetized field $H_d$ generated by the magnetic flux supported by the wire has a distribution therealong that can be similar to the waveform illustrated in FIG. 1*d*.

As will be noted from the graph of FIG. 1*d*, the demagnetizing field $H_d$ has its greatest amplitude or intensity of both polarities at the transition region or domain wall of the ends of the magnetic domain. This demagnetizing flux $H_d$ is defined by the equation:

$$H_d \propto \frac{B_s A_w}{\lambda^2}$$

where:

$A_w = \pi r^2$ $r$ = the radius of the wire $B_s$ = maximum flux density of the alloy at saturation λ = the length of the transition region of the magnetic domain From this equation, it can be seen that, as the diameter domain. the wire is decreased, the maximum level of the demagnetizing field $H_d$ also decreases in an exponential manner or function. Furthermore, it can be seen that, as the length of the transition region decreases, the maximum level of the demagnetizing field $H_d$ increases. As a result, the finer the magnetic wire is, the shorter the transition region λ can be without unduly raising or increasing the maximum level of the demagnetizing field $H_d$.

Consequently, if the domain wall motion threshold field $H_o$ of the magnetic material is kept greater than or equal to the maximum level of the demagnetizing field $H_d$ supported by the wire, the magnetic domain will not spread out. If, however, the demagnetizing field $H_d$ supported by the wire exceeds the domain wall motion threshold field $H_o$, then the domain will have a tendency to a tendency out and increase its length until the demagnetizing field $H_d$ about equals the domain wall motion threshold field $H_o$. From this it can be seen that, if the domain wall motion threshold field $H_o$ can be controlled, it is possible to shorten the length λ of the transition region, thereby effectively increasing the storage density capacity of the magnetic medium or wire. In addition, by controlling the domain wall motion threshold field $H_o$ so that it is very much less than the nucleating threshold field $H_s$, wherein they could differ by 15 oersteds or more, the level of the externally applied drive field H does not have to be too precise. Furthermore, since the propagation velocity of the magnetic material is proportional to externally applied drive field H minus the domain wall motion threshold field $H_o$ ($H - H_o$), lowering the domain wall motion threshold field $H_o$, increases the propagation velocity of the material.

Figure 6:
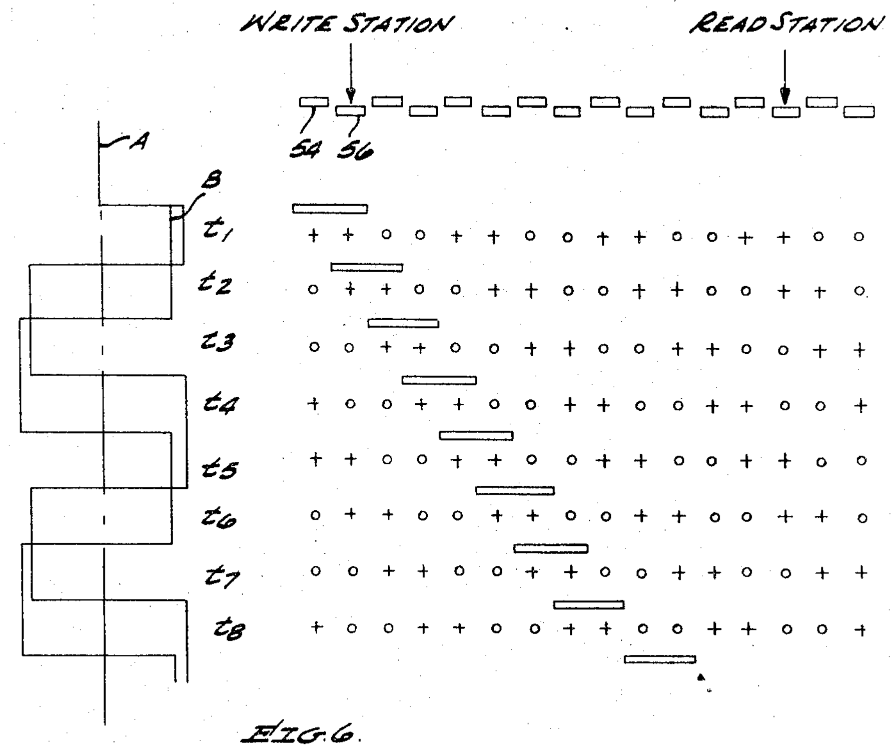
FIG. 6 is a graph illustrating the magnetic drive field produced by the drive windings of the shift register of FIG. 5 in response to polyphase drive current pulses A and B applied thereto at specific time intervals.

Furthermore, as a result of the decrease in the demagnetizing field $H_d$ supported by the fine wire, it is possible to closely space the adjacent turns of the wires when they are wound in a helical pattern around the cylindrical polyphase shifting array, as will be described subsequently with reference to FIG. 6. Under the influence of a drive magnetic field generated by drive windings in the polyphase shifting array, the magnetic domains are propagated or shift along the length of the storage medium or wire.

An investigating of the various magnetic alloys from which a wire possessing the required match between the domain wall motion threshold field $H_o$ and the demagnetizing field $H_d$ could be made has resulted in the development of a propagational alloy comprised of cobalt-iron and vanadium. More specifically, the alloy from which the magnetic storage wire is made comprises 2.0 —5.0 percent by weight vanadium, 38 —39 percent by weight cobalt and the remainder iron, wherein the ratio of cobalt to iron is kept to 2:3. This alloy has a maximum flux density $B_s$ of approximately 18,000 gauss where the maximum flux density is the maximum magnetic flux or magnetic induction that the material will support at saturation. As will be explained in more detail subsequently, a desired high volumetric storage density magnetic wire drawn from this alloy is made b 0.0003 inch in diameter to keep the total magnetic flux below 9 milli-maxwells.

EXAMPLE 1

The desired alloy is obtained by preparing a melt containing cobalt, iron and vanadium of the prescribed proportions by placing commercial grade virgin metal into a high frequency induction furnace or an equivalent vacuum furnace and heating above the melting temperature of all of the constituent metals. The alloy is held in the molten state for 30 to 60 minutes in order to assure a homogeneous mixture. The resulting molten mixture is then poured into a mold such as a graphite cylindrical mold approximately 0.5 inch in diameter. The alloy and the mold are then cooled and the 0.5 inch in diameter ingot of alloy is removed and prepared by centerless grinding to remove surface defects. The prepared ingot is then swaged into a rod approximately 0.250 inch in diameter and annealed to a temperature between 900° C. and 1,000° C. This annealing step must be terminated by quenching the swaged rod to room temperature at a rate greater than 250° C. per second.

The material is again swaged to reduce the diameter of the rod to approximately 0.125 inch and is then annealed by heating it to a temperature between 900° C. and 1,000° C. and then quickly quenching it to room temperature at a rate greater than 250° C. per second.

The material is then drawn to 0.030 inch in diameter wire such as by means of a single block drawing machine. The 0.030 inch wire is further drawn to the final size wire of 0.0003 inch in diameter such as by means of a multiple die drawing machine. Thus, the final drawing step in this fabrication process involves a cold reduction in the cross-sectional area of the material, which is greater than 99 percent. Because of the ductility of this particular alloy, it is possible to draw the material to the very fine wire described.

The 0.0003 inch in diameter iron-cobalt-vanadium wire obtained directly from the cold drawing process is a hard drawn wire which does not necessarily possess the desirable magnetic field threshold characteristics for use in a magnetic shift register data storage device, since the nucleating threshold field $H_s$ does not exceed the domain wall motion threshold field $H_o$ until tensile stress closely approaching the yield point of the material is applied. The reason for this is that when the percentage of reduction in the area of the wire from the last stress relief anneal is greater than approximately 95 percent, a pronounced slip-induced atomic order is generated within the metallurgical structure of the wire. Since this alloy class has a body-centered cubic (b.c.c.) crystalline structure, it deforms through a plane which occurs toward a (111) direction relative to the axis of the wire, or drawing axis. Thus, this slip system tends to develop a strong crystalline texture during drawing. This results in an atomic ordering in the cobalt-iron lattice that is oriented to produce a strong, easy axis for magnetization which is radial to, or perpendicular to the axis or length of the wire. This slip-induced orthogonal magnetic easy axis is so strong in the hard drawn 0.0003 inch alloy wire that the threshold field of the wire displays virtually no response to tensile stress until the yield point of the material is approached. In addition, the magnitudes of the domain wall motion threshold field $H_o$ and the nucleating threshold field $H_s$ of the wire is extremely high approximately 40 to 50 oersteds).

These characteristics can be changed to more desirable values in accordance with the preceding teaching, by subjecting the hard drawn wire to an anneal or a normalizing heat treatment which destroys the undesirable slip induced directional order. As a result, the easy axis will be oriented predominantly at 45° to the axis of the wire due to the texture induced during drawing. The anneal destroys the slip induced atomic order but does not alter the texture of the wire, thus leaving the bulk of the crystals with one of their planes parallel to the axis of the wire. After anneal the easy axis of the individual crystals is the (100) crystalline axis, all of which are oriented at 45° from the axis of the wire. To attain these results, a normalizing heat treatment step must be conducted at a temperature above the recrystallization temperature of the alloy (about 600° C.). By subjecting the material to a temperature in excess of the recrystallization temperatures, grain growth is induced in the material. As the grain size is increased, the coercivity $H_c$ which is very closely related to the domain wall motion threshold field $H_o$ decreases. Consequently, the domain wall motion threshold field $H_o$ also decreases. As a result, the normalizing heat treatment can be used to establish the magnitude of the domain wall motion threshold field $H_o$ of the alloy in the fine wire by regulating the grain growth permitted to occur during the heating cycle.

This heat treating can be accomplished by regulating the temperature and time duration of the heat cycle and quenching or colling the wire from the annealing temperature to room temperature at a rate in excess of 250° C. per second.

Figure 2:
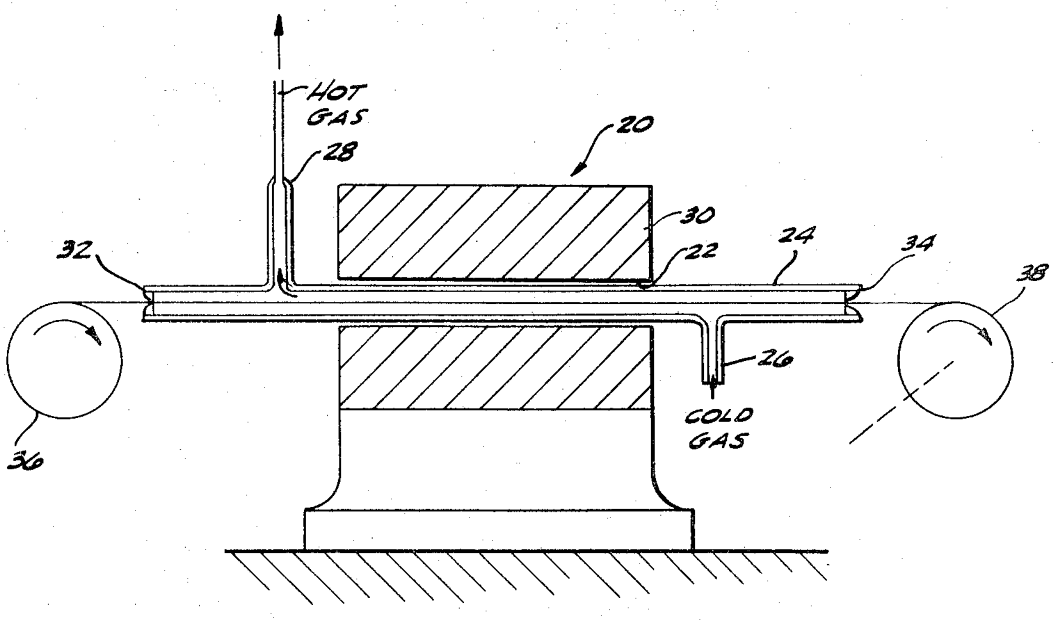
FIG. 2 is a schematic diagram of a tube furnace of the type that can be used for annealing the drawn alloy magnetic medium.

One type of furnace that can be used for this step is illustrated in FIG. 2. It consists basically of a 2 foot-long electrically heated tube furnace 20, having a heating chamber 22 through which a quartz tube 24 extends. The quartz tube 24 has a cold gas inlet 26 located on the output side of the tube furnace 20 and a hot gas outlet 28 located on the other input side of the tube furnace 20. The heating chamber of the tube furnace 20 utilizes a standard multiple heating element 30 arranged so that the outer edges of the furnace can be overdriven to generate greater heat to compensate for the greater heat losses at these areas in the heating chamber. This gives some control over the temperature uniformity and assures that the greatest possible temperature transition will occur at the output end of the heating chamber during the quenching phase. In operation, the magnetic storage material is passed through an aperture centrally located in teflon inserts 32 and 34 mounted at each end of the quartz tube 24 as it is drawn from a low friction spindle 36 by torque applied to the shaft of a spindle 38. These inserts tend to seal the quartz tube 24 so that the cold, dry hydrogen gas is flowed from the gas inlet 26 through the heating chamber 22 of the tube furnace 20 in a direction opposite to the direction of wire travel, where it accepts heat transferred from the heated material during the quenching process and is exhausted from the quartz tube at a hot gas outlet 28. Thus, the greatest possible temperature transition occurs at the output end of the tube furnace whereupon the quenching phase of the heat treatment is accomplished.

Investigation has shown that the domain wall motion threshold field parameter $H_o$ of the described cobalt-iron-vanadium wire can be regulated to any value in a range from 12 oersteds to 10 oersteds through use of the normalizing heat treatment or annealing at a temperature range from 660° C. to 720° C. at a wire feed rate of from 10 to 80 feet per minute. More specifically, the domain wall motion threshold field $H_o$ of approximately 15 oersteds is developed when the wire is pulled through the hydrogen atmosphere tube furnace held at 700° C. at a rate that will provide a heat cycle of 2 to 3 seconds' duration. In other words, these parameters can be obtained in the furnace described above by pulling the wire through the heating chamber at a feed rate of 60 to 40 feet per minute, respectively. In addition, this wire feed rate provides a quench of 2,220° C. to 1,730° C. per second, which is in excess of the 250° C. per second minimum quench rate.

Figure 3:
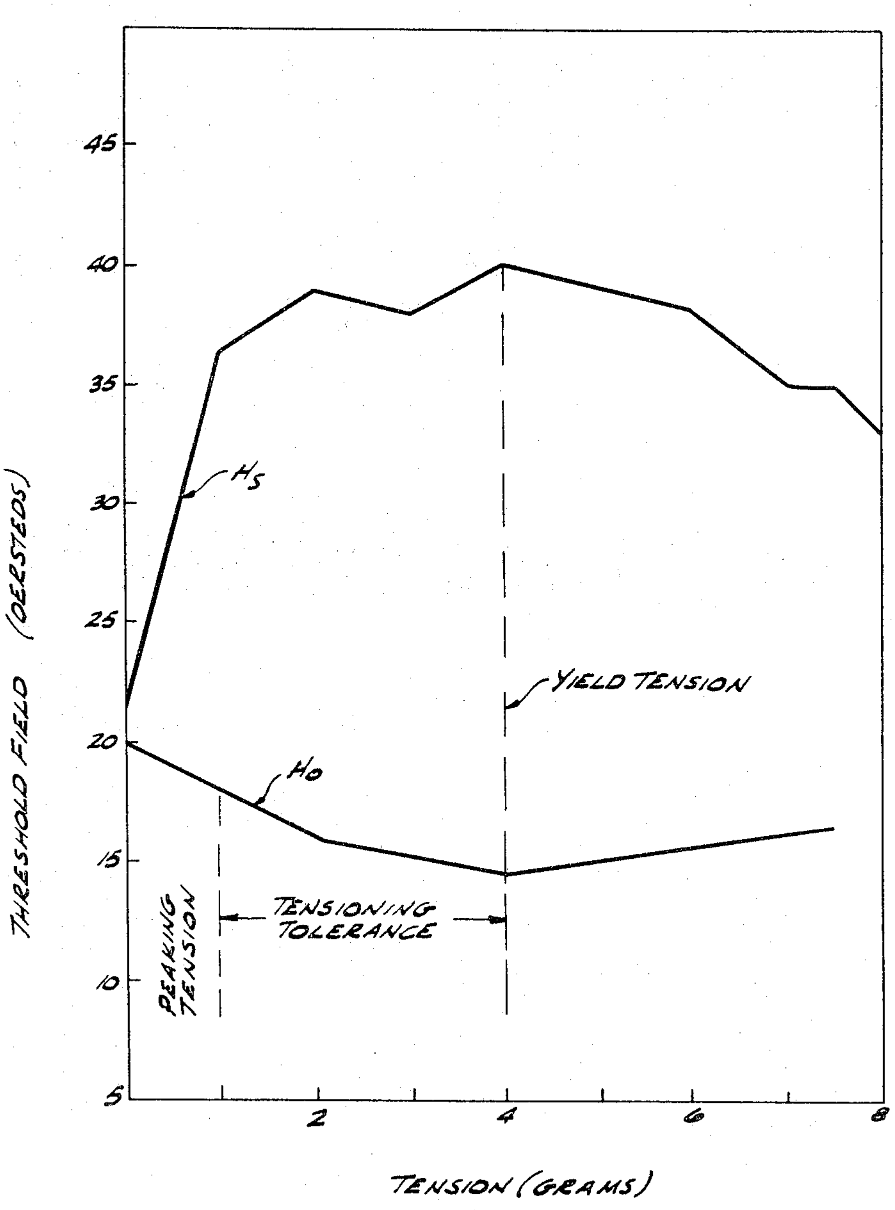
FIG. 3 is a graph illustrating the magnetic characteristics of the magnetic medium when the medium is subjected to tensile stresses.

The fine wire so produced by this process will exhibit the magnetic threshold field characteristics illustrated in FIG. 3 when subjected to tensile stress. For example, when tension is applied to a 0.0003 inch in diameter cobalt, iron and vanadium alloy wire which has been annealed at 700° C., the nucleation recording threshold field $H_s$ quickly rises from 21 oersteds to about 37 oersteds, whereafter it substantially levels off at this level until the yield point of the alloy is reached. The domain wall motion threshold field $H_o$ decreases from 20 oersteds and approaches about 15 oersteds until the yield point is reached. From this it can be seen that the annealing process substantially reduces the domain wall motion threshold field $H_o$ of the material, and that when tensile stress is applied to the material, the nucleation recording threshold field $H_s$ is very much greater than the domain wall motion threshold field, whereupon the material and wire can be used in a magnetic shift register of the type to be described with reference to FIG. 5.

Figure 4:
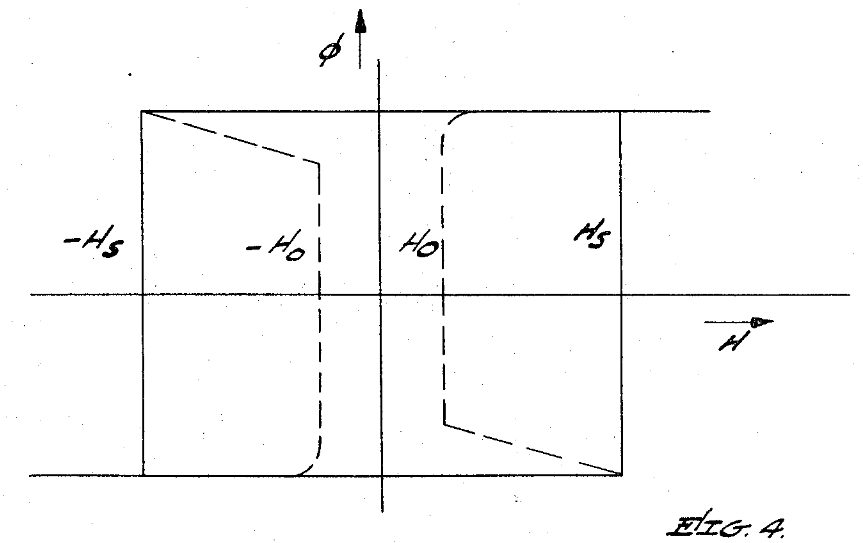
FIG. 4 is a graph illustrating the hysteresis loop characteristics of the annealed magnetic medium when subjected to tensile stress.

When the annealed alloy wire is subjected to tensile stress, it exhibits a BH curve of hysteresis loop characteristic of the type illustrated generally in FIG. 4. For example, the nucleating threshold field $H_s$ exhibits a substantially square hysteresis loop as represented by the solid line. The domain wall propagation threshold field $H_o$, however, diverges from the nucleating threshold field $H_s$.

In order to record a domain on the wire, a write field $H_w$ is applied parallel to the axis of the wire so that when the write field $H_w$ is added to the drive field H, the nucleating threshold field $H_s$ of the wire is exceeded, whereupon a discrete magnetic domain of a reversed polarity relative to a reference magnetic field is recorded on the segment of the wire which receives the two fields.

Figure 5:
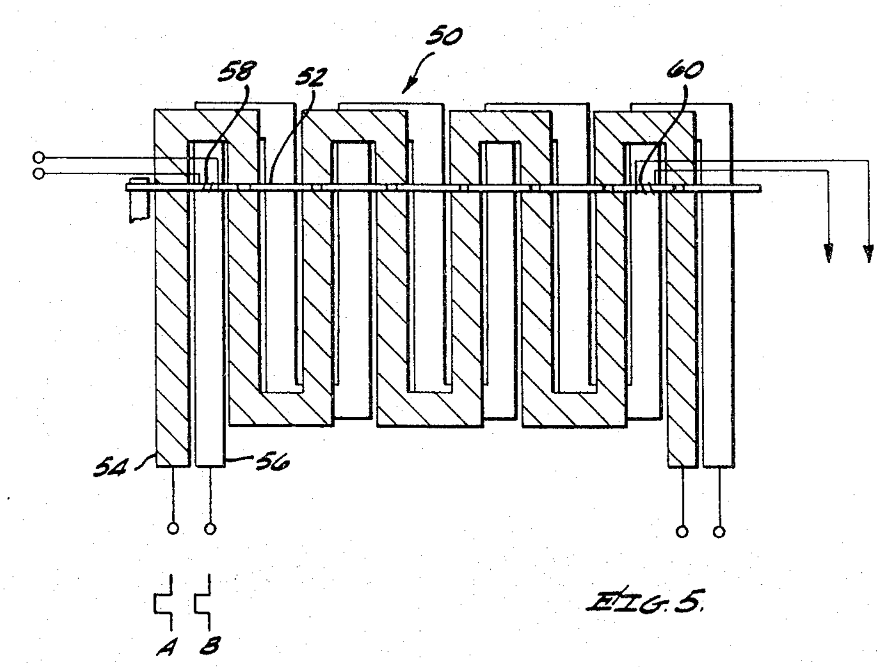
FIG. 5 is a schematic diagram illustrating the exemplary shift register which utilizes the magnetic wire.

As illustrated in FIG. 5, when the propagational characteristics of stressed ferromagnetic alloy wire of the above type is used in a general form of magnetic shift register 50, the fine wire 52 is disposed under tension across two sets of interlaced domain-advancing windings 54 and 56, respectively. These domain advancing windings 54 and 56 are angulated to traverse back and forth across the fine wire 52 in an alternating sequence. The magnetic domains are recorded on the magnetic wire 52 by a multiple-turn write winding 58 which encircles the magnetic wire 52 near one end. As will be explained in more detail shortly, the recorded domain is advanced, or propagated, through the wire 52 toward the other end thereof by a polyphase drive field, whereat it is read by a multiple-turn read winding 60 which encircles the wire near the end thereof.

The operation of the magnetic wire shift register 50 can best be explained with reference to the space-time diagram of FIG. 6. In this diagram, the abscissa is representative of the two sets of domain-advancing windings and the ordinate is representative of the timing of drive pulses A and B fed to the two sets of domain-advancing windings 54, and 56, respectively during the time periods $t_1$ —$t_8$. The coordinates of the domain-advancing windings and the pulses are representatives of the polyphase magnetic drive field applied to the magnetic wire 52 during each phase of the input pulse signals wherein the +'s are representative of a magnetic drive field which will favor the existence of a magnetic domain and the dots are representative of a magnetic drive field which opposes or compresses a magnetic domain. It can be seen from this diagram that the drive field pattern appears to step or advance one drive winding width to the right during each phase of the input pulses.

Assuming that no magnetic domains are recorded on the magnetic wire 52 and that it is initially magnetized to a reference remanence state or polarity by means of a biasing field applied at the input end of the wire by means of a small permanent magnetic or additional coil 62 located just ahead of the write winding 58, if the current signals applied to the drive winding 56 is at a level which produces a drive field H which has an amplitude greater than the domain wall motion threshold field $H_o$, but less than the nucleating threshold field $H_s$, the magnetic wire 52 is in condition for storing information. Information is entered into the shift register 50 by driving the magnetic wire 52 with a localized magnetic field having a level which is greater than the nucleating threshold field $H_s$ by means of the write winding 58 located near one end of the wire and superposed relative to the drive winding 56. This write field has a direction which is additive with the positive drive field of the drive winding 56. Thus, a write operation can be accomplished under any of the phase time intervals $t_1$, $t$ 5, $t_9$, etc. to create a discrete magnetic domain which is of an opposite polarity to the reference magnetic state of the magnetic wire 52. In forming the magnetic domain, it will start as a small, reversed nucleus, which will grow by propagational switching to the extremities of the positive field pattern that favors the existence of a reversed polarity magnetic domain. Thus, the magnetic domain will become two drive winding widths long and will be prohibited from expanding beyond the domain favoring + drive field by the reference polarity favoring magnetic field adjacent each end of the positive magnetic field, or the opposing polarity drive field on each side of the + drive field. If the shift register 50 is constructed in accordance with the previously described parameters, this magnetic domain will retain its length and shape even when no input signals are applied to the drive windings 54 and 56. In other words, the minimum length of magnetic domain that can be used to meet this requirement is limited by the magnitude of the demagnetizing field $H_d$ of the stored domain and the magnitude of the domain wall motion threshold field H of the wire. In general, this length must be kept long enough to assure that the static stability demands of the individual domain walls or transition region at both ends of the stored domain can be met without mutual interference.

During the phase time period $t_2$, the pulse signal applied to the drive winding 54 goes negative. As a result, the polarity of the magnetic field segments generated by it reverse and the leading edge of the magnetic domain is located in the center of a field which favors the growth of the domain in the same direction in which the field appeared to be shifted. Thus, the leading edge of the magnetic domain propagates to the new rightmost extremity of the contiguous + field pattern. At the same tine, the trailing edge of the magnetic domain is now located in the middle of a magnetic field which opposes its existence As a result, this trailing edge of the magnetic domain is coerced to propagate in the direction which will compress its length and thus propagates in the same direction that the leading edge is propagated. Thus, during each phase time period, both transition regions of the stored magnetic domains are propagated simultaneously one drive winding width in the same direction. In this manner, the length of the magnetic domains are retained as they are propagated through the length of the magnetic wire 52 during the time periods $t_2$ through $t_n$ where $n$ = the $n$th integral time period.

Readout from the shift register 50 is obtained when the flux transition region at the leading edge of the magnetic domain is propagated through the read winding 60 upon nearing one end of the magnetic wire 52.

In order to prevent the magnetic domain from merging into one another, a reference or guard segment of magnetic wire magnetized to the reference magnetic polarity is maintained between adjacent stored domains or storage locations. Establishment of these guard segments is accomplished by simply waiting one full cycle time of the two-phase drive currents ($t_1$ through $t_4$) before attempting to write a second storage informational domain into the magnetic wire 52. Meeting this requirement establishes a 1:1 ratio between data transfer rates and the complete cycle time of the two-phase propagating drive currents.

If digital pulse signals, which are commonly called digital ONEs and digital ZEROs, are to be stored on the magnetic wire 52 in accordance with the above technique, the magnetic domains of reversed polarity recorded on the segments of magnetic wire can be arbitrarily designated as the digital ONEs, while the digital ZEROs can be established by not recording a magnetic domain at an established write-in time, thereby leaving a storage location blank.

Figure 7:
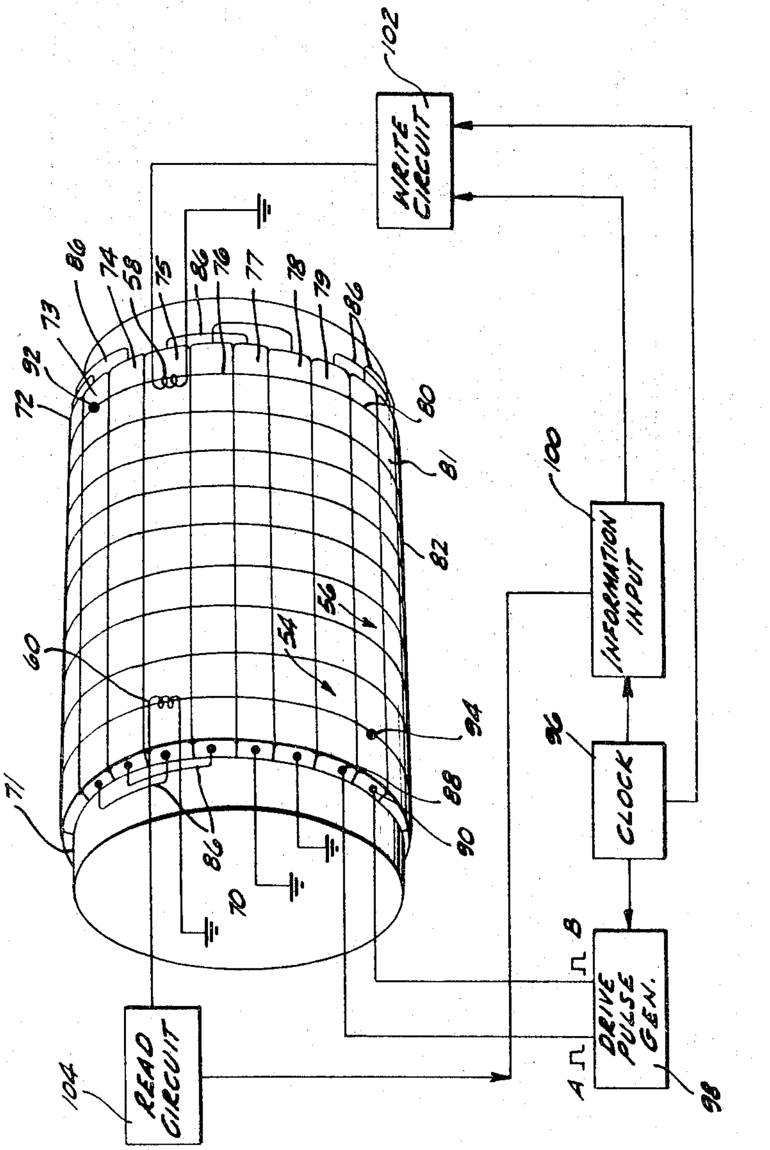
FIG. 7 is a schematic illustration of a cylindrical array magnetic shift register and associated electronics which includes the magnetic wire which is wound in a helix around the drive windings.

Large capacity magnetic shift registers 50 which operates in the same manner as the exemplary shift register of FIG. 5 can be constructed in a cylindrical array as illustrated schematically in FIG. 7. More specifically, the shift register includes a cylindrical body member 70 having at least a surface of dielectric material. The drive winding 56 and 58 are made up of a plurality of ribbonlike electrical conductors mounted on the cylindrical surface and arranged in spaced-apart parallel relationship to one another, parallel to the axis of the cylindrical body member 70. The odd-numbered one of the ribbonlike conductors 71 through 81, etc., are interconnected in series circuit relationship by end straps 86 to form the drive winding 56 so that when the current pulse B is applied to the input terminal 88, it traverses back and forth across the surface of the cylindrical body member 70 through the individual conductors to generate every other segment of the drive field until it is conducted to ground. It should be noted these alternate segments oppose and favor the existence of magnetic domains stored on the fine magnetic wire 52. The even-numbered conductors 72 through 82, etc., are also interconnected in series circuit relationship at their ends by means of end straps 86 to form the drive windings 54. Current pulses A applied to an input terminal 90 at one end of the drive winding 54 traverses back and forth across the surface of the cylindrical body member through the individual conductors to produce every other magnetic drive field segments which alternately oppose and favor the existence of the magnetic domains until the current pulse is conducted to ground. In order to have a continuity of the polyphase drive fields throughout any 360° of the cylindrical array, it is necessary that the individual conductors be a multiple of four.

The fine magnetic wire 52 is wound in a tight-pitched helix to traverse the individual conductors in the drive windings 54 and 56 and is stressed to a preselected tension. As a result of this tension, the fine magnetic wire is maintained in position, preventing lateral shift thereof. The write winding 58 encircles a segment of the fine magnetic wire 52 toward one end thereof which end can be considered the input end. The read winding 60 encircles a segment of the fine magnetic wire 52 toward the other end thereof which can be considered the output end. The fine magnetic wire 52 is firmly fastened to the surface of the cylindrical array at each end by suitable fastening means 94 and 96 such as epoxy cement applied to several selvage turns of the fine wire to maintain proper tension on the wire 52. It has been found that the desirable 15 oersteds domain wall motion threshold field $H_o$ can be obtained from the previously disclosed annealed 0.0003 inch diameter cobalt-iron-vanadium wire when it is maintained at a tensile force of 1 to 4 grams — the upper tension being limited by the yield strength of the wire. Furthermore, it has been found that the individual conductors of the drive windings 54 and 56 can be mounted on 0.025 inch centers and that the distance or pitch between adjacent helixes of the wire can be 0.006 inch. As a result, a single storage wire magnetic shift register 0.637 inch in diameter and 2.40 inches long, can be readily constructed to store 12,800 digital bits, thus providing a volumetric storage density of 16,700 digital bits per cubic inch; or $$\frac{12,800}{0.767''}=16,700 \text{ bits/inch}^3$$

Electronics for operating this shift register can include a clock pulse generator 96, which is coupled to a drive pulse generator 98, which in turn generates the A-phase current drive pulse signal which is fed on one line to the input terminal 90 of the shift register 50, and the B-phase current drive pulse signal which is fed on a second output line to the input terminal 88 of the shift register. In addition, the output of the clock pulse generator 96 is fed to synchronize an information input unit 100 and to synchronize the operation of a write circuit 102. Thus, information pulse signals from the information input unit 100 are fed to one input of the write circuit 102 so that a digital ONE information pulse is fed to the write winding 58 only when a clock pulse enables the write circuit 102. A digital ZERO is stored by not feeding a current signal to the write winding during a designated time interval. As previously stated, this will occur during the arbitrarily designated times $t_1$, $t_5$ and $t_9$, etc., whereupon a reversed polarity magnetic domain is recorded on the fine magnetic wire 52. Thereafter, this magnetic domain is shifted around the shift register 50 until it is propagated through the read winding 60, where it induces an output signal which is detected by a read circuit electronics 104. If it is desired to recirculate this pulse rather than to lose it, a recirculating loop, including a lead 106, is connected from the output of read circuit 104 to an input terminal of the information input unit 100, whereupon the read out information can be rewritten into the shift register 50 in its proper sequence.

While the salient features have been illustrated and described with respect to particular embodiments, it should be readily apparent that modifications can be made within the spirit and scope of the invention, and it is therefore not desired to limit the invention to the exact details shown and described.

I claim:

1. In a magnetic storage device including a plurality of drive windings coupled to receive electrical signals for generating magnetic drive fields wherein the improvement comprises: a magnetic storage medium comprising a fine wire having a cold reduction in the cross-sectional area greater than 95 percent and containing 2 percent — 5 percent vanadium, 38 percent — 39 percent cobalt, and the remainder substantially iron, said fine wire having been annealed to the degree that would have been attained at about a temperature between 660° C. and 720° C. and quenched at a rate greater than 250° C. per second over a sufficient period of time to substantially reduce the domain wall motion threshold field of said fine hard drawn wire, said fine wire being operable to be disposed across the drive windings with its axis substantially parallel to the direction of generated magnetic drive fields, and means for maintaining said fine hard drawn wire under tensile stress sufficient to create an easy axis oriented toward the axis of said fine wire, a nucleation threshold field greater than the magnetic drive field level, and a domain wall motion field less than the drive field level.

2. The magnetic storage device of claim 1 in which the ratio of cobalt to iron is kept about 2:3.

3. The magnetic storage device of claim 2 in which said wire is annealed to about the degree obtained at a temperature of about 710° C. for about 1½ to 3 seconds and a quench rate between about 2,220° C. and 1,730° C. per second.

4. The magnetic storage device of claim 2 in which said fine wire is annealed in a hydrogen atmosphere.

5. The magnetic storage device of claim 4 wherein said fine wire is about 0.0003 inch in diameter.

6. A magnetic storage device of a type operable to be subjected to tensile stress, comprising a fine wire having a cold reduction in the cross-sectional area greater than 95 percent and containing 2 percent — 5 percent by weight vanadium, 38 percent — 39 percent by weight cobalt, and the remainder substantially iron, said fine wire having been annealed to about the degree that is attained at about a temperature in a range from 660° C. — 720° C., and quenched at a rate greater than 250° C. per second over a period of time sufficient to substantially reduce the domain wall motion threshold field of said fine hard drawn wire.

7. The magnetic storage device of claim 6 in which the ratio of cobalt to iron is kept about 2:3.

8. The magnetic storage device of claim 7 in which said fine wire is annealed in a hydrogen atmosphere 9. The magnetic storage device of claim 8 wherein said fine wire is about 0.0003 inch in diameter.

PO-1050
(5/69)

UNITED STATES PATENT OFFICE
CERTIFICATE OF CORRECTION

Patent No. 3,568,171 Dated March 2, 1971

Inventor(s) Tommy G. Lesher

It is certified that error appears in the above-identified patent and that said Letters Patent are hereby corrected as shown below:

Col. 2, line 32, "by" should be --be--;
line 38, "one" should be --once--.
Col. 3, line 12, "information" should be --informational--;
line 14, following "than" omit "b";
line 55, "domain." should be --of--;
line 69, "a tendency" (second occurrence) should be --spread--.
Col. 4, line 17, "shift" should be --shifted--;
line 19, "investigating" should be --investigation--;
line 34, following "made" omit "b".
Col. 5, line 9, preceding "plane" insert -- [110] --;
line 11, following "strong" insert -- [110] --;
line 21, following "high" insert -- ( --;
line 27, preceding "texture" insert -- [110] --;
line 30, preceding "planes" insert --[110]--;
line 50, "colling" should be --cooling--.
Col. 6, line 8, "10" should be --20--;
line 47, following "$H_s$" insert --between the knee and the saturati point as represented by the dashed line, so that the domai wall motion threshold field $H_O$ is less than the nucleating threshold field $H_s$.--
Col. 7, line 30, "t5" should be --$t_5$--.
Col. 8, line 30, "winding" should be --windings--;
line 34, "one" should be --ones--.

Signed and sealed this 14th day of September 1971.

(SEAL)
Attest:

EDWARD M.FLETCHER,JR.
Attesting Officer

ROBERT GOTTSCHALK
Acting Commissioner of Pater